(12) United States Patent
Izzo

(10) Patent No.: US 11,547,238 B2
(45) Date of Patent: Jan. 10, 2023

(54) LASAGNA NOODLE COOKING AND DRYING RACK

(71) Applicant: Paul Izzo, Howell, NJ (US)

(72) Inventor: Paul Izzo, Howell, NJ (US)

( * ) Notice: Subject to any disclaimer, the term of this patent is extended or adjusted under 35 U.S.C. 154(b) by 341 days.

(21) Appl. No.: 17/033,711

(22) Filed: Sep. 26, 2020

(65) Prior Publication Data

US 2022/0095830 A1  Mar. 31, 2022

(51) Int. Cl.
*A47J 36/16* (2006.01)
*A47J 43/28* (2006.01)
*A47J 27/10* (2006.01)

(52) U.S. Cl.
CPC .............. *A47J 36/16* (2013.01); *A47J 27/10* (2013.01); *A47J 43/284* (2013.01)

(58) Field of Classification Search
CPC ..... A47B 55/02; A47B 57/581; A47B 73/002; A47B 87/001; A47B 87/02; A47F 3/147; A47F 5/0031; A47F 5/01; A47F 5/13; A47F 5/132; A47F 5/135; A47F 5/137; A47F 5/14; A47F 7/148; A47J 27/10; A47J 36/16; A47J 36/20; A47J 36/22; A47J 43/284; A47L 19/00; A47L 19/02; A47L 19/04
USPC .......... 211/41.1, 41.2, 41.3, 41.4, 41.5, 41.6, 211/85.31, 85.4, 126.8, 126.9, 133.2, 211/133.5, 181.1; D6/678.4, 680.3; D7/409
See application file for complete search history.

(56) References Cited

U.S. PATENT DOCUMENTS

| | | | | |
|---|---|---|---|---|
| 549,875 | A * | 11/1895 | Lepper | B42F 17/02 211/181.1 |
| 680,450 | A * | 8/1901 | Aiken | A47F 7/175 211/44 |
| 1,350,351 | A * | 8/1920 | Abbott | A47L 19/04 211/41.4 |
| 1,461,474 | A * | 7/1923 | Breer | A47L 19/04 D32/55 |
| 2,367,218 | A * | 1/1945 | Joyce, Jr. | A43D 117/00 211/181.1 |
| 2,440,507 | A * | 4/1948 | Geralds | B65D 25/106 D7/704 |
| D167,356 | S * | 7/1952 | Jensen | D6/675.5 |
| 2,841,288 | A * | 7/1958 | Field | A47L 19/04 D32/55 |
| 2,934,210 | A * | 4/1960 | Jordan | A47J 47/20 D6/678.4 |
| D189,356 | S * | 11/1960 | Kolkey | D6/678.4 |

(Continued)

*Primary Examiner* — Joshua E Rodden

(57) ABSTRACT

A Lasagna noodle cooking and drying rack including, a plurality of noodle cooking shelves formed from a plurality of horizontal shelf arms and a plurality of horizontal support members with the horizontal shelf arms attached to a plurality of vertical shelf support structures at an incline to hold the noodles securely on their individual shelves during the cooking process. Cooking the noodles on their individual shelves prevents the noodles from sticking together and promotes even cooking of the noodles which in turn prevents them from breaking apart when they are removed from the cooking water. The Lasagna noodle cooking and drying rack has a removable handle which can be hooked on to the two end vertical support structures to lift the rack from the cooking pot. The Lasagna noodles can be drained and dried on their individual shelves after the rack is lifted out of the cooking water.

7 Claims, 4 Drawing Sheets

(56) References Cited

U.S. PATENT DOCUMENTS

| | | | | |
|---|---|---|---|---|
| 3,214,031 | A * | 10/1965 | McCauley | A47B 81/04 |
| | | | | D7/704 |
| 3,997,060 | A * | 12/1976 | Kunin | A47F 5/01 |
| | | | | 211/181.1 |
| D421,062 | S * | 2/2000 | Goodman | D19/86 |
| D473,732 | S * | 4/2003 | Hardy | D6/675.2 |
| 7,104,409 | B2 * | 9/2006 | Morgan | A47F 5/01 |
| | | | | 211/41.1 |
| D542,092 | S * | 5/2007 | Raichlen | D7/409 |
| D628,856 | S * | 12/2010 | Wang | D7/637 |
| D677,077 | S * | 3/2013 | Selby | D6/678.4 |
| D823,078 | S * | 7/2018 | Tuang | D7/704 |
| D850,169 | S * | 6/2019 | Tsai | D6/678.4 |
| D861,427 | S * | 10/2019 | Irwin, Jr. | D7/409 |
| D924,004 | S * | 7/2021 | Witberg | D7/409 |
| D925,257 | S * | 7/2021 | Amendt | D6/675.5 |
| 2007/0199908 | A1 * | 8/2007 | Kasden | A47J 47/16 |
| | | | | 211/41.5 |

* cited by examiner

LASAGNA NOODLE COOKING AND DRYING RACK

FIELD OF THE INVENTION

The present invention generally relates to cookware. More particularly, the invention relates to a Lasagna noodle cooking and drying rack providing a more convenient way to cook Lasagna noodles.

BACKGROUND OF THE INVENTION

Lasagna is a savory main dish enjoyed by many in the United States and around the world. A major ingredient in the making of the Lasagna dish are, the Lasagna noodles. Although Lasagna noodles can be made by hand following a recipe and the right equipment, most home cooks find it more convenient to use the pre-packaged Lasagna noodles available in the stores. The packaged store bought Lasagna noodles are generally dry and brittle requiring them to be immersed in water and cooked for a period of time to soften and make them pliable so that they can be layered between the sauce, cheese and other ingredients to form the dish before baking.

Lasagna noodles are generally cooked in a big pot of boiling water. When the noodles are initially introduced into the cooking pot, the top end of each noodle extends out from the pot, resulting in only the lower parts of the noodles getting submerged in the cooking water. Once the lower parts of the noodles submerged in water soften as they cook, the practice generally is to push down the pliable cooked ends so that the upper ends of the noodles sticking out of the pot can be submerged in the water and get cooked. This may result in some of the noodles breaking.

The other challenge in cooking Lasagna noodles is that they generally have a tendency to stick together while in the cooking water preventing the exposure of parts of their individual surfaces to the cooking water, and resulting in uneven cooking of each noodle, with some areas of each noodle being soft and other areas hard, and not completely cooked. It is generally the practice to stir the noodles while they are cooking to prevent them from sticking together which results in some of the noodles tearing and/or breaking apart. A partial tear can sometimes turn into a complete break as the noodles continue to cook and become increasingly softer and weaker.

A third challenge in cooking Lasagna noodles is to extricate them from the cooking water without tearing or breaking the individual noodles. The noodles have to be individually removed from the cooking water without tearing or breaking them. This is a very delicate and somewhat difficult procedure since the cooked noodles are soft and slippery. Further as each noodle is extricated with a pair of tongs or other suitable utensil, the others remaining in the hot cooking water continue to cook and become softer and more prone to breaking. A noodle that is overcooked is more slippery and difficult to handle without breaking. Once the noodles are removed from the cooking water, they have to be placed on a suitable surface to drain and dry before using them to construct the Lasagna dish with the sauce, cheese and other ingredients.

The ultimate goal when cooking Lasagna noodles is to produce unbroken, evenly cooked noodles to construct the Lasagna dish. The present invention of a Lasagna noodle cooking and drying rack accomplishes the goal of producing evenly cooked, unbroken Lasagna noodles for the preparation of the Lasagna dish.

The exemplary features of the Lasagna noodle cooking and drying rack of the present invention will become obvious to one skilled in the art through the summary of the invention, detailed description of the invention, and the claims that follow.

SUMMARY OF THE INVENTION

The present invention is a Lasagna noodle cooking and drying rack for use with a compatible cooking pot to cook dry and brittle Lasagna noodles in water or other liquid, without breaking the noodles.

The primary object of the invention is to provide a Lasagna noodle cooking and drying rack that cooks Lasagna noodles without the noodles breaking during the cooking process, or when they are lifted out of the cooking liquid, after completion of the cooking process.

Yet another object of the present invention is to provide a Lasagna noodle cooking and drying rack that provides individual noodle holding shelves to hold each sheet of Lasagna noodle separately, to prevent the noodles from sticking to each other during the cooking process.

A related object of the present invention is to provide a Lasagna noodle cooking and drying rack that promotes even cooking of each noodle held on their individual shelves on which they are placed, by facilitating the removal of all the noodles from the cooking water at the same time, so that no individual noodle cooks longer than the others.

Another object of the Lasagna noodle cooking and drying rack is to facilitate retaining the Lasagna noodles on their individual shelves after the cooking process, to dry the noodles without having to handle them and risk breaking them so that a complete unbroken noodle can be taken from each shelf to form the layers for the Lasagna dish.

Yet another object of the Lasagna noodle cooking and drying rack is to save time by eliminating the need to tend to the Lasagna noodles during cooking by frequently stirring them, to prevent them from sticking together.

Another object of the Lasagna noodle cooking and drying rack is to save time by being able to remove all the Lasagna noodles from the cooking water at the same time in one motion without damaging them, a process that is usually slow and time consuming during conventional cooking of the noodles where each noodle has to be carefully removed one at a time, to prevent them from breaking.

The exemplary embodiment of the Lasagna cooking and drying rack of the present invention is comprised of a rectangular base support structure that holds a plurality of five or more vertical, shelf support structures spaced equidistant from each other on the base support structure. In this embodiment, the top ends of the vertical support structures at the two ends of the rack assembly have a substantially inverted V-shaped loop structure to function as catch loops to hold the two ends of a handle that is used to lift the rack holding the Lasagna noodles into and out of the cooking pot. In this embodiment of the invention, a plurality of approximately eight or more horizontal shelf arms are attached to each vertical support structure with the middle of each horizontal shelf arm bent at an angle between the two vertical members comprising each vertical support structure. In this embodiment, each row of the horizontal shelf arms has at least two horizontal support units attached to the shelf arms to hold in place the Lasagna noodle sheet placed on that shelf Each row of horizontal shelf arms and their horizontal support units hold one sheet of Lasagna noodle.

In the exemplary embodiment of the Lasagna noodle cooking and drying rack of the invention as described, each sheet of dry Lasagna noodle is loaded on to one shelf of the rack and the complete rack unit holding the Lasagna noodles is lowered into a cooking pot with boiling water or other cooking liquid using the handle hooked to the top end of the outermost two shelf support structures having the inverted V-shaped loop ends. The handle is removed from the two shelf support structures as the noodles cook and at the end of the cooking process the handles are hooked back on to the inverted V-shaped loop ends of the shelf support structures to lift the rack out of the cooking water or liquid. The rack holding the cooked noodles is placed on a trivet or other surface to allow the cooked noodles to drain and dry before they are removed from the shelves of the cooking rack and used in the assembly of the Lasagna dish.

In this summary of the invention, and in the specification in general, reference to, an "exemplary embodiment" means that a particular feature, structure, or characteristic described in conjunction with the referenced embodiment is included in at least some embodiments, but not necessarily all embodiments of the invention. The objects and features of the Lasagna noodle cooking rack of the present invention as described in this summary of the invention will be further appreciated and will become obvious to one skilled in the art when viewed in conjunction with the drawings, detailed description of the invention and the appended claims.

DETAILED DESCRIPTION OF THE INVENTION

The present invention is a Lasagna noodle cooking and drying rack to cook dry, brittle Lasagna noodles individually to prevent them from sticking together during the cooking process which promotes even cooking of the noodles and prevents them from breaking apart when they are removed from the cooking liquid, and with the additional benefit of the noodles being retained on the racks for draining and drying, before their use for assembling the Lasagna dish.

Figure 1:
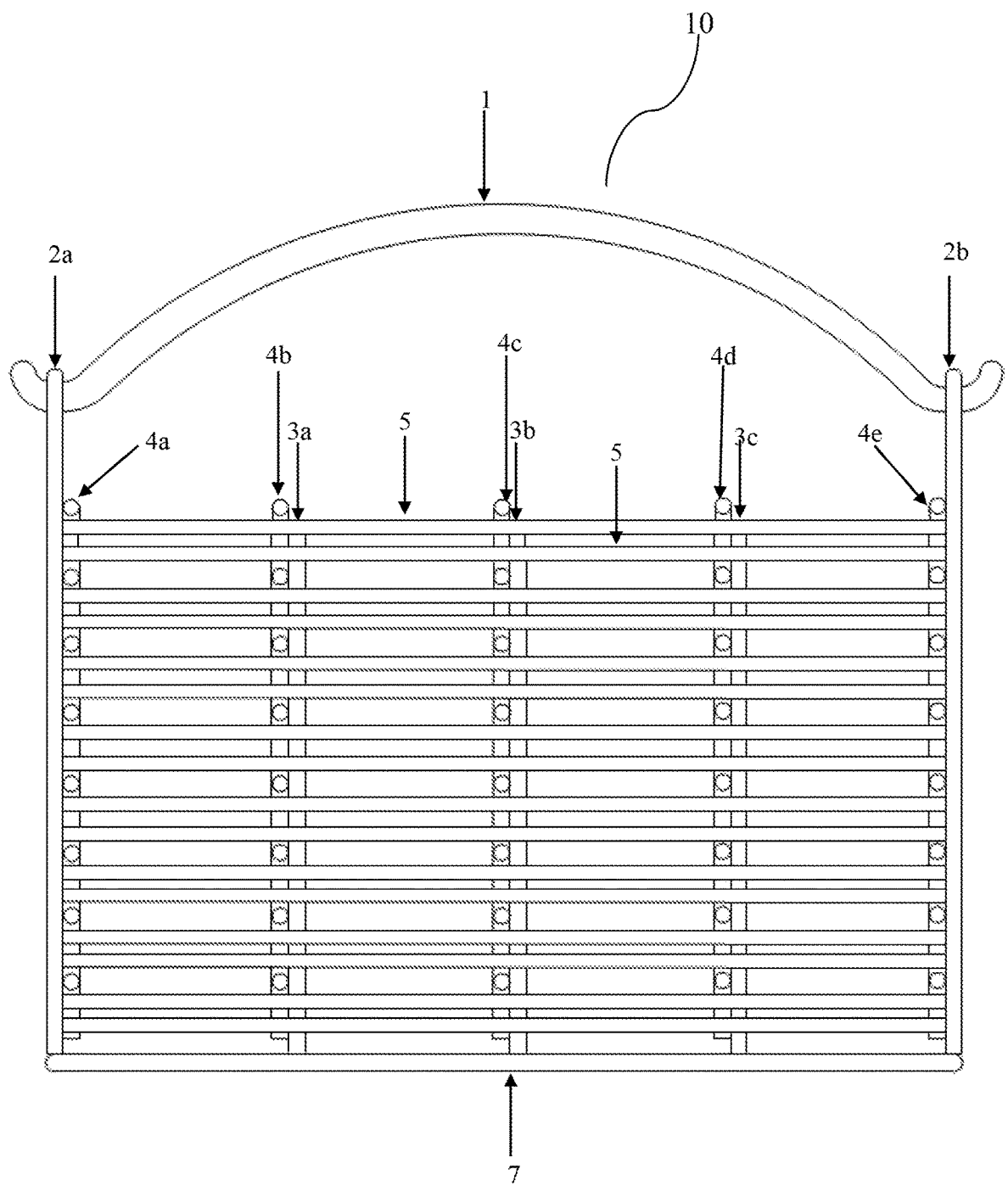
FIG. 1 is a perspective side view of the assembled Lasagna noodle cooking and drying rack of the present invention.

Referring now to the drawings wherein like numerals represent like components in the several views presented and discussed, and more particularly referring now to FIG. 1 the figure is a perspective side view of the assembled Lasagna noodle cooking and drying rack 10 of the present invention. The exemplary components of the Lasagna noodle cooking and drying rack 10 are a set of vertical shelf support structures 2a, 2b, 3a, 3b and 3c. Of these vertical shelf support structures, 2a and 2b comprise the vertical shelf support structures at the two ends of the Lasagna noodle cooking and drying rack 10 which are attached to a substantially rectangular base support structure 7. The top ends of the vertical shelf support structures 2a and 2b at the two ends of the lasagna noodle cooking and drying rack 10 have an inverted V-shaped configuration forming a loop through which the two ends of a removable handle 1 can be inserted to lift and hold the Lasagna noodle cooking and drying rack 10. The middle vertical shelf support structures 3a, 3b and 3c are lower in height as compared to the end vertical shelf support structures 2a and 2b. The lower ends of the vertical support structures 2a and 2b are attached to the base support structure 7 at either ends of the base support structure 7. The shelf support structures 3a, 3b and 3c attach one each to each of the middle vertical columns of the shelf arms, In this embodiment of the Lasagna noodle cooking rack 10 each vertical shelf support structure is configured with a plurality of approximately eight or more horizontal shelf arms represented by the numerals 4a, 4b, 4c, 4d and 4e shown in this figure as the ends of the top most shelf arms as an example. In this view of the Lasagna noodle cooking rack 10 each of the circles represent the ends of each shelf arm of the rack. In this embodiment of the Lasagna noodle cooking and drying rack 10 each horizontal shelf arm has horizontal support members represented by the numerals 5 in this view. The function of the horizontal support members 5 attached to each horizontal shelf arm is to add integrity to the overall assembly of the Lasagna cooking and drying rack and also to prevent the noodle from falling down vertically between the shelf arms.

In operation, once the Lasagna noodles are placed into each horizontal shelf, the handle 1 is hooked on to the inverted V-shaped loop end of the vertical shelf support structures 2a and 2b and the entire assembled Lasagna noodle cooking and drying rack 10 is lowered into a compatible pot of water or other cooking liquid and the noodles cooked for the recommended time period. Once the noodles are cooked, the handle 1 is inserted into the inverted V-shaped top loop ends of the vertical shelf support structures 2a and 2b and the rack holding the noodles is taken out of the cooking water or liquid, and placed on a surface to drain the water from the cooked noodles, and allow them to dry while still on their respective shelves on the rack. This procedure of cooking the Lasagna noodles using the Lasagna noodle cooking and draining rack of the present invention, prevents the noodles from sticking to each other which is common with traditional cooking procedures. Cooking the Lasagna noodles using the Lasagna noodle cooking and drying rack 10 of the present invention assures even cooking of each noodle, and also prevents the noodles from breaking apart during cooking. An evenly cooked, unbroken Lasagna noodle allows for the assembly of the noodles in the making of the Lasagna dish easier and less cumbersome.

Figure 2:
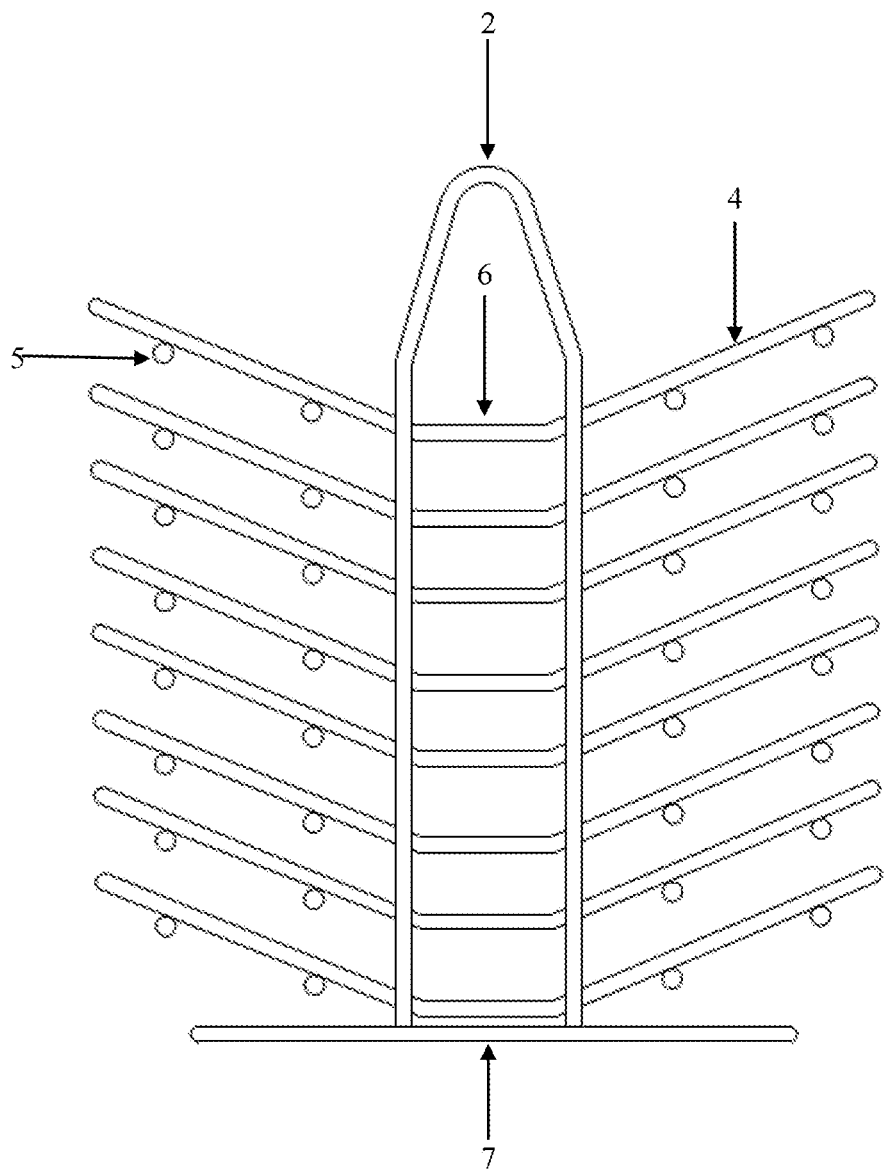
FIG. 2 is an end view of one end of the Lasagna noodle cooking and drying rack of the present invention.

Referring now to FIG. 2 the figure is an end view of one end of the Lasagna noodle cooking and drying rack 10. This view shows one of the two vertical shelf support structures 2 at one end of the Lasagna noodle cooking and drying rack attached to the base support structure 7. As previously described, the vertical shelf support structures 2 at the two ends of the Lasagna noodle rack have an inverted V-shaped loop at the top end of the structures as seen in this figure. The inverted V-shaped loop at the top end of the two vertical shelf support structures serves as a catch loop for the removable handle to lift the assembled cooking rack and to place the rack in a pot of water for cooking the Lasagna noodles and also to lift up the rack assembly out of the water or cooking liquid after the noodles are cooked. The plurality of approximately eight horizontal shelf arms 4 are attached to the vertical shelf support structure 2 with the middle of each horizontal shelf arm 4 having one or more bends 6 to an upward angle occurring between the two vertical members of the vertical shelf support structure 2 forming two connected shelf arms on either side of the vertical support structure 2. Each of the shelf arms 4 has two pairs of horizontal support members 5 with one pair of the horizontal support member 5 on the shelf arm 4 on one side of the vertical shelf support structure 2 and the second pair of horizontal support member 5 on the shelf arm 4 on the other side of the vertical shelf support structure 2. Each row of shelf arms 4 and the two pairs of horizontal support members 5 form an individual shelf of the rack assembly. The remaining vertical shelf support structures not shown in this view all have similar configurations. Each vertical shelf support structure also acts as a support against which the side of the Lasagna noodle is able to rest. During the cooking process, the boiling water will cause the noodles to lift and bounce in the water. The incline of the shelf arms keeps the noodles indexed against the vertical shelf support structures, preventing the noodles from migrating off the open side of the shelf, or migrating to the noodle on the adjacent shelf and overlapping each other.

Figure 3:
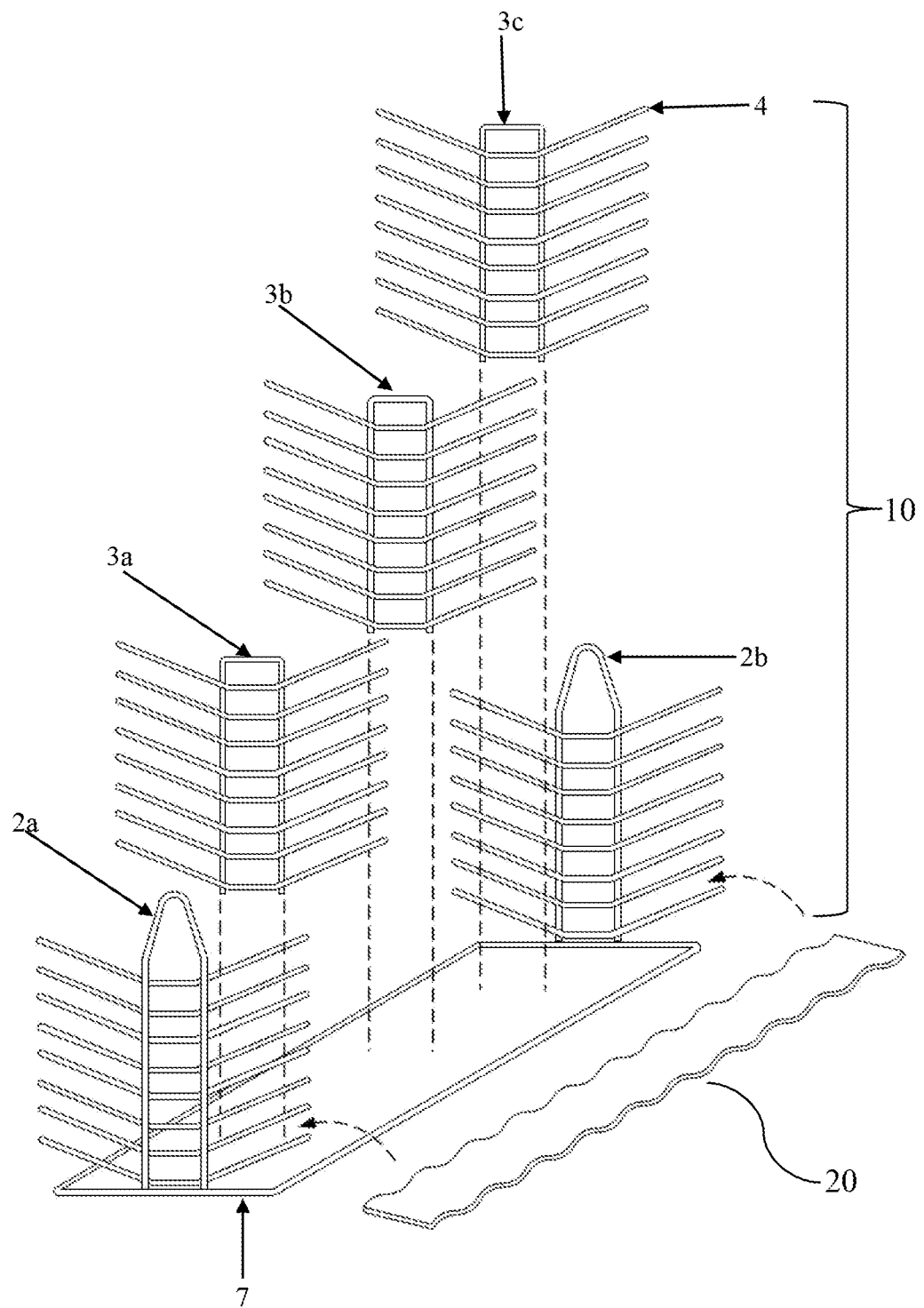
FIG. 3 is an exploded view of the Lasagna noodle cooking and drying rack of the invention showing the manner in which a Lasagna noodle is inserted into a shelf through the shelf arm of the Lasagna noodle cooking and drying rack.

FIG. 3 is an exploded view of the Lasagna noodle cooking and drying rack 10 of the invention and the manner in which a Lasagna noodle is inserted into a shelf through the shelf arms 4. This view shows the vertical shelf support structures 2a and 2b attached to the two ends of the base support structure 7 with the direction of placement of the vertical shelf support structures 3a, 3b and 3c between the vertical shelf support structures 2a and 2b.

Figure 4:
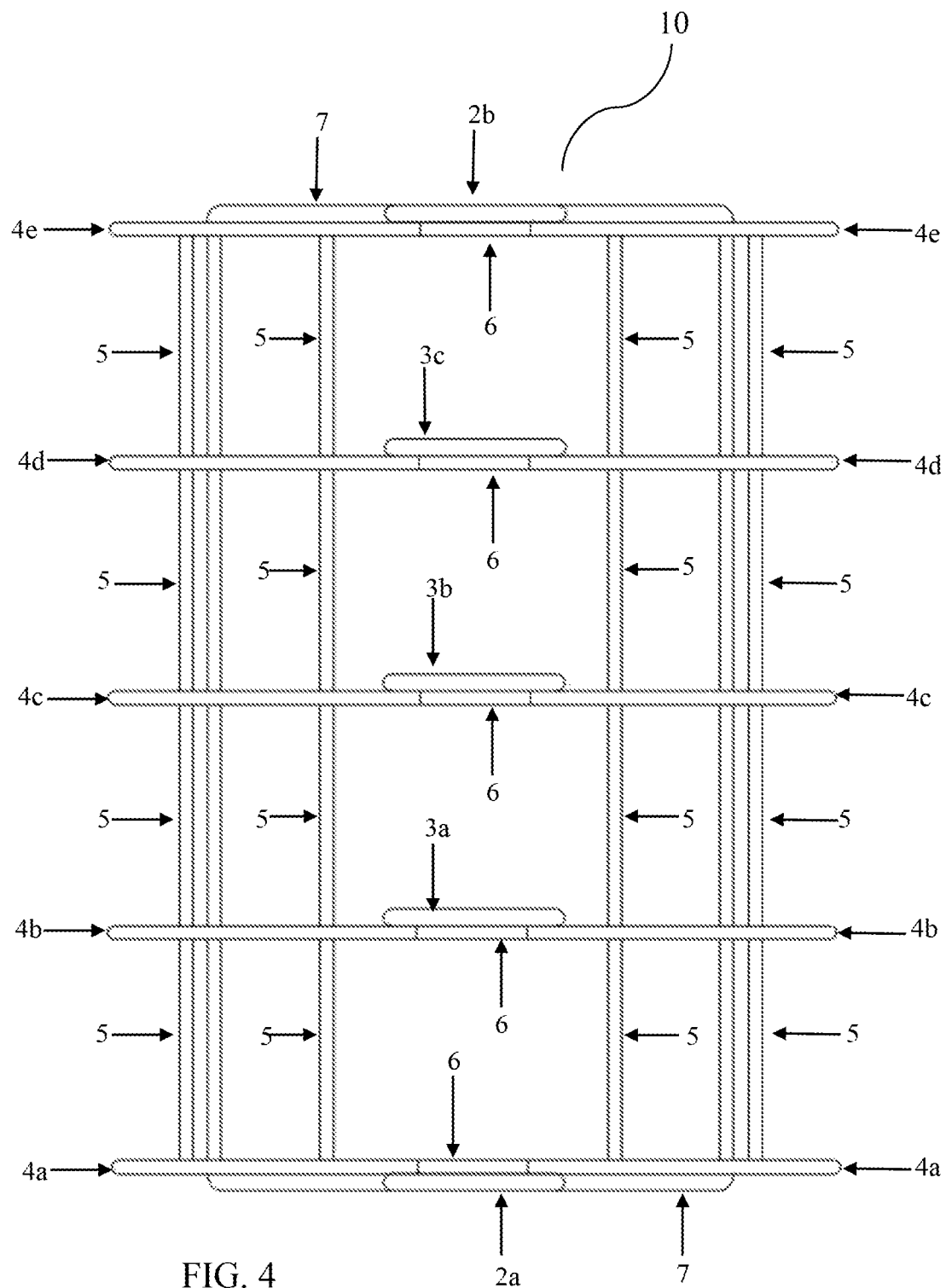
FIG. 4 is a Birds Eye view of the Lasagna noodle cooking and drying rack of the present invention.

FIG. 4 is a Birds Eye view of the Lasagna noodle cooking and drying rack of the present invention showing the two end vertical support structures 2a and 2b, the middle vertical support structures 3a, 3b and 3c and the arm bends 6 at the middle of each shelf arm 4a, 4b, 4c, 4d and 4e, This view also shows the plurality of horizontal support members 5 of the shelf arms and the base support structure 7.

The foregoing description of the present invention through its figures and preferred embodiment should not be construed to limit the scope of the invention. It is to be understood that the embodiment of the invention as described herein do not limit any application or scope of the invention and that the invention can be carried out and practiced in various ways and implemented in embodiments other than the one outlined in the description above. It is to be further understood that the phraseology and terminology used to describe the invention are for descriptive purposes only. It should be understood and obvious to one skilled in the art that alternatives, modifications, and variations of the embodiment of the present invention may be construed as being within the spirit and scope of the appended claims.

What is claimed is:

1. A Lasagna noodle cooking and drying rack comprising:
   a substantially rectangular base support structure;
   a plurality of vertical shelf support structures placed equidistant from each other;
   wherein two of said vertical shelf support structures having a substantially inverted V-shaped loop at a top end of said two of said vertical shelf support structures;
   wherein said two of said vertical shelf support structures having said substantially inverted V-shaped loop at said top end of said two of said vertical shelf support structures are attached at a distal end to said substantially rectangular base support structure at two ends of said substantially rectangular base support structure;
   a plurality of horizontal shelf arms;
   said plurality of horizontal shelf arms each attached to respective ones of said vertical shelf support structures with a middle of each horizontal shelf arm bent at an angle between two vertical members of said respective ones of said vertical shelf support structures forming two connected shelf arms on either side of said respective ones of said vertical shelf support structures;
   a plurality of horizontal shelf arm support members attached to respective ones of said shelf arms;
   wherein a row formed from aligned ones of said plurality of horizontal shelf arms of respective ones of said plurality of vertical shelf support structures in combination with respective ones of said plurality of horizontal shelf arm support members attached to said aligned ones of said plurality of horizontal shelf arms form one shelf of said rack on which an individual Lasagna noodle is configured to be placed; and
   a removable handle configured to hook into said inverted V-shaped loop at said top ends of said two vertical support structures to lift said rack and place said rack into a pot of cooking water and lift up said rack from said cooking water by hooking said handle to said inverted V-shaped loop at said top end of said two vertical shelf support structures.

2. The Lasagna noodle cooking and drying rack of claim 1, wherein the middle of each horizontal shelf arm bent at an angle between the vertical members of the respective ones of said vertical shelf support structures creates an incline of the shelf arms which is configured to keeps the noodles on their individual shelves without them migrating off an open side of each shelf.

3. The Lasagna noodle cooking and drying rack of claim 1, wherein the vertical shelf support structures connected to the shelf arms are configured to act as a stop support against which sides of the Lasagna noodles are able to rest and retain the noodles on their individual shelves without them migrating to the noodle on the adjacent shelf.

4. The Lasagna noodle cooking and drying rack of claim 1, wherein a function of the horizontal support members attached to each respective ones of said horizontal shelf arms is to prevent lateral movement of the Lasagna noodle placed into each shelf of the lasagna noodle cooking and drying rack and also to prevent the noodle from falling down vertically between adjacent ones of the shelf arms.

5. The Lasagna noodle cooking and drying rack of claim 1, wherein placing each individual noodle on a shelf of the Lasagna noodle cooking and drying rack prevents the noodles from sticking to each other during a cooking process and promotes even cooking of each noodle.

6. The Lasagna noodle cooking and drying rack of claim 1, wherein cooking the Lasagna noodles on respective ones of the shelves prevents the noodles from breaking apart during cooking and when they are taken out of cooking liquid after completion of a cooking process.

7. The Lasagna noodle cooking and drying rack of claim 1, wherein each cooked noodle is configured to be retained on a respective one of the shelves for draining the cooking water from the noodles and drying the noodles after the rack is lifted out of the cooking water at an end of a cooking process.

* * * * *